(12) United States Patent
Bradley

(10) Patent No.: US 6,372,143 B1
(45) Date of Patent: Apr. 16, 2002

(54) PURIFICATION OF PRODUCED WATER FROM COAL SEAM NATURAL GAS WELLS USING ION EXCHANGE AND REVERSE OSMOSIS

(75) Inventor: Robert L. Bradley, Montgomery, TX (US)

(73) Assignee: Hydrometrics, Inc., Helena, MT (US)

(*) Notice: Subject to any disclaimer, the term of this patent is extended or adjusted under 35 U.S.C. 154(b) by 0 days.

(21) Appl. No.: 09/669,543

(22) Filed: Sep. 26, 2000

(51) Int. Cl.⁷ .......................... B01D 15/04; B01D 61/02
(52) U.S. Cl. .................. 210/638; 210/651; 210/652; 210/663; 210/170; 210/670; 521/26; 405/53
(58) Field of Search ................ 210/670, 677, 210/687, 688, 651, 652, 663, 664, 747, 912, 913, 170, 259, 263, 295, 638; 588/17, 249, 250; 521/26; 405/53; 166/75.12

(56) References Cited

U.S. PATENT DOCUMENTS

| | | |
|---|---|---|
| 4,321,145 A | 3/1982 | Carlson |
| 5,250,185 A | 10/1993 | Tao et al. |
| 5,266,203 A | 11/1993 | Mukhopadhyay et al. |
| 5,665,783 A * | 9/1997 | Katzakian, Jr. et al. |
| 5,695,643 A * | 12/1997 | Brandt et al. |
| 5,925,255 A | 7/1999 | Mukhopadhyay |

* cited by examiner

Primary Examiner—Joseph W. Drodge
Assistant Examiner—Richard W. Ward
(74) Attorney, Agent, or Firm—DeLio & Peterson, LLC

(57) ABSTRACT

A method and apparatus are provided for treating produced water to lower the total dissolved solids of the water for safe discharge to the environment. The produced water is passed through a weak acid cation resin in $H^+$ form to remove cations in the produced water and then preferably through a decarbonator to remove formed $CO_2$ and to provide a first discharge stream. The cation loaded resin is then regenerated using a dilute acid, preferably diluted with produced water, to regenerate the resin to the $H^+$ form. The resultant acid regenerated waste stream is discharged to a reject deep well. The acid regenerated resin is then rinsed, preferably with produced water, to remove residual salts to form a residual salt containing rinse stream. This salt stream is passed into a reverse osmosis unit to form a high salt containing reject stream which is discharged to a waste deep well and a low salt containing product discharge stream which may be safely discharged to the environment.

5 Claims, 1 Drawing Sheet

US 6,372,143 B1

PURIFICATION OF PRODUCED WATER FROM COAL SEAM NATURAL GAS WELLS USING ION EXCHANGE AND REVERSE OSMOSIS

BACKGROUND OF THE INVENTION

1. Field of the Invention

This invention relates generally to the purification of water and, in particular, to the removal of dissolved solids from produced water formed from natural gas wells associated with bituminous coal deposits.

2. Description of Related Art

Pollution is a serious environmental problem for both industry and the public. Of particular concern are streams and lakes used as water supplies and government regulations limit the amount of various substances which may be discharged into and/or present in the water. In general, there are a number of different methods for the purification of water which include mechanical treatment by sedimentation, filtration or membranes; chemical purification by use of chemicals, gases or resins; and biological treatment by mixing water with bacteria to convert pollutants to innocuous byproducts.

Waste water from industrial processes typically contains a wide variety of undesirable components which restrict its use or safe disposal into lakes and streams. Standards regulating the content of waste water disposed into natural bodies of water or injected underground have become more and more strict over the years and is of particular environmental concern. One industrial waste water which is produced in large quantities is termed produced water and is generated in numerous processes including the operation of natural gas wells. Produced water typically contains large amounts of dissolved solids and the term total dissolved solids (TDS) represents the amount of total dissolved solids in the water stream.

Produced water contains a wide variety of components depending on its origin and for convenience the following description will be specifically directed to produced water formed in the operation of natural gas wells and in particular those associated with bituminous coal deposits. It will be appreciated by those skilled in the art however that the method and apparatus of the invention may be used to treat other waste waters including produced water to reduce the TDS of the water for safe discharge into lakes and streams.

In the operation of natural gas wells especially those associated with bituminous coal deposits, natural gas produced from the deposits is associated with high TDS ground water. The ground water is entrained with the natural gas as it comes to the surface and the ground water becomes a serious disposal problem since the TDS of the produced water is too high to be discharged to the surface streams surrounding the gas fields.

The produced water from these type fields typically contain greater than about 1000 ppm TDS with the large majority of the dissolved solids being in the form of sodium bicarbonate. Smaller amounts of calcium, magnesium, potassium and barium carbonates are also typically present. To safely discharge such produced water into surface streams it is usually necessary to reduce the TDS to less than 100 ppm and preferably less than 50 ppm, e.g., 25 ppm typically. It is important that the method and apparatus used to lower the TDS of the waste stream be efficient and cost effective.

Bearing in mind the problems and deficiencies of the prior art, it is therefore an object of the present invention to provide a method for treating produced water for lowering the total dissolved solids of the water for safe environmental discharge to surface streams and other water supplies.

It is another object of the present invention to provide an apparatus for treating produced water for lowering the total dissolved solids of the water for safe environmental discharge to surface streams and other water supplies.

Still other objects and advantages of the invention will in part be obvious and will in part be apparent from the specification.

SUMMARY OF THE INVENTION

In accordance with the above goals and objectives, in the present invention there is provided in one aspect a method for treating produced water to lower the total dissolved solids (TDS) of the water for safe environmental discharge comprising the steps of:

passing the produced water through a cation exchange resin, preferably a weak acid cation resin in a $H^+$ form, to remove cations (dissolved solids) and form a reduced dissolved solids produced water stream and a solids loaded resin;

passing the reduced dissolved solids produced water stream, preferably with air, through a decarbonator (mixer) apparatus to remove formed gases such as $CO_2$ as an off gas stream and forming a first discharge stream having a reduced TDS concentration;

discharging the first discharge stream to the environment;

regenerating the solids loaded resin to a $H^+$ form with a dilute acid solution, preferably a $H_2SO_4$ solution, and preferably diluted with produced water, to remove solids from the solids loaded resin into the dilute acid (sulfuric acid) stream forming an acid regenerated waste stream and an acid regenerated resin;

rejecting the acid regenerated waste stream to a deep well or environmentally safe reject site;

rinsing the acid regenerated resin with water, preferably produced water, to remove residual salts from the acid regenerated resin forming a residual salt containing rinse stream;

passing the residual salt containing rinse stream into a separation unit to remove salt from the stream and preferably a reverse osmosis unit forming a reverse osmosis reject stream and a reverse osmosis product discharge water stream;

rejecting the reverse osmosis reject stream (high salt) to a deep well or other environmentally safe reject site; and discharging the reverse osmosis product water discharge stream (low salt) to the environment.

In another aspect a method for treating produced water to lower the total dissolved solids (TDS) of the water for safe environmental discharge is provided comprising the steps of:

passing the produced water through a cation exchange resin, preferably a weak acid cation resin in a $H^+$ form, to remove cations (dissolved solids) and form a first discharge stream and a solids loaded resin;

discharging the first discharge stream to the environment;

regenerating the solids loaded resin to a $H^+$ form with a dilute acid solution, preferably a $H_2SO_4$ solution, and preferably diluted with produced water, to remove solids from the solids loaded resin into the dilute acid (sulfuric acid) stream forming an acid regenerated waste stream and an acid regenerated resin;

rejecting the acid regenerated waste stream to a deep well or environmentally safe reject site;

rinsing the acid regenerated resin with water, preferably produced water, to remove residual salts from the acid regenerated resin forming a residual salt containing rinse stream;

passing the residual salt containing rinse stream into a separation unit to remove salt from the stream and preferably a reverse osmosis unit forming a reverse osmosis reject stream and a reverse osmosis product discharge water stream;

rejecting the reverse osmosis reject stream (high salt) to a deep well or other environmentally safe reject site; and discharging the reverse osmosis product water discharge stream (low salt) to the environment.

In a further aspect of the invention, the treated water of the above methods for discharge to the environment may be treated with lime or other such materials to control the sodium/calcium ratio, pH and the like of the discharge water.

In another aspect of the invention an apparatus is provided for treating produced water to lower the total dissolved solids of the water for safe environmental discharge comprising:

a resin, preferably a weak acid cation resin and preferably in a $H^+$ form, held in a tank or other container, for contacting produced water to remove cations and form a reduced dissolved solids produced water stream and a solids loaded resin;

mixing means to mix the reduced dissolved solids produced water stream with air to remove formed gases such as $CO_2$ as an off gas stream and form a first discharge stream having reduced total dissolved solids, which first discharge stream is discharged to the environment;

means for adding an acid, preferably a weak acid, such as a dilute sulfuric acid stream (and preferably diluted with produced water) to the solids loaded resin forming an acid regenerated resin and an acid regenerated waste stream which stream is discharged to a deep well or other environmentally safe reject site;

means for adding rinse water, preferably produced water being treated, to the acid regenerated resin to form a residual salt containing rinse stream; and a separation unit to remove salt from the stream and preferably a reverse osmosis unit to treat the residual salt containing rinse stream to form a reverse osmosis reject stream (high salt) for discharge to a deep well or other environmentally safe reject site and a reverse osmosis product water discharge stream (low salt) for discharge to the environment.

In another aspect of the invention an apparatus is provided for treating produced water to lower the total dissolved solids of the water for safe environmental discharge comprising:

a resin, preferably a weak acid cation resin and preferably in a $H^+$ form, held in a tank or other container, for contacting produced water to remove cations and form a first discharge stream for discharge to the environment and a solids loaded resin;

means for adding an acid, preferably a weak acid, such as a dilute sulfuric acid stream (and preferably diluted with produced water) to the solids loaded resin forming an acid regenerated resin and an acid regenerated waste stream which stream is discharged to a deep well or other environmentally safe reject site;

means for adding rinse water, preferably produced water being treated, to the acid regenerated resin to form a residual salt containing rinse stream; and a separation unit to remove salt from the stream and preferably a reverse osmosis unit to treat the residual salt containing rinse stream to form a reverse osmosis reject stream (high salt) for discharge to a deep well or other environmentally safe reject site and a reverse osmosis product water discharge stream (low salt) for discharge to the environment.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
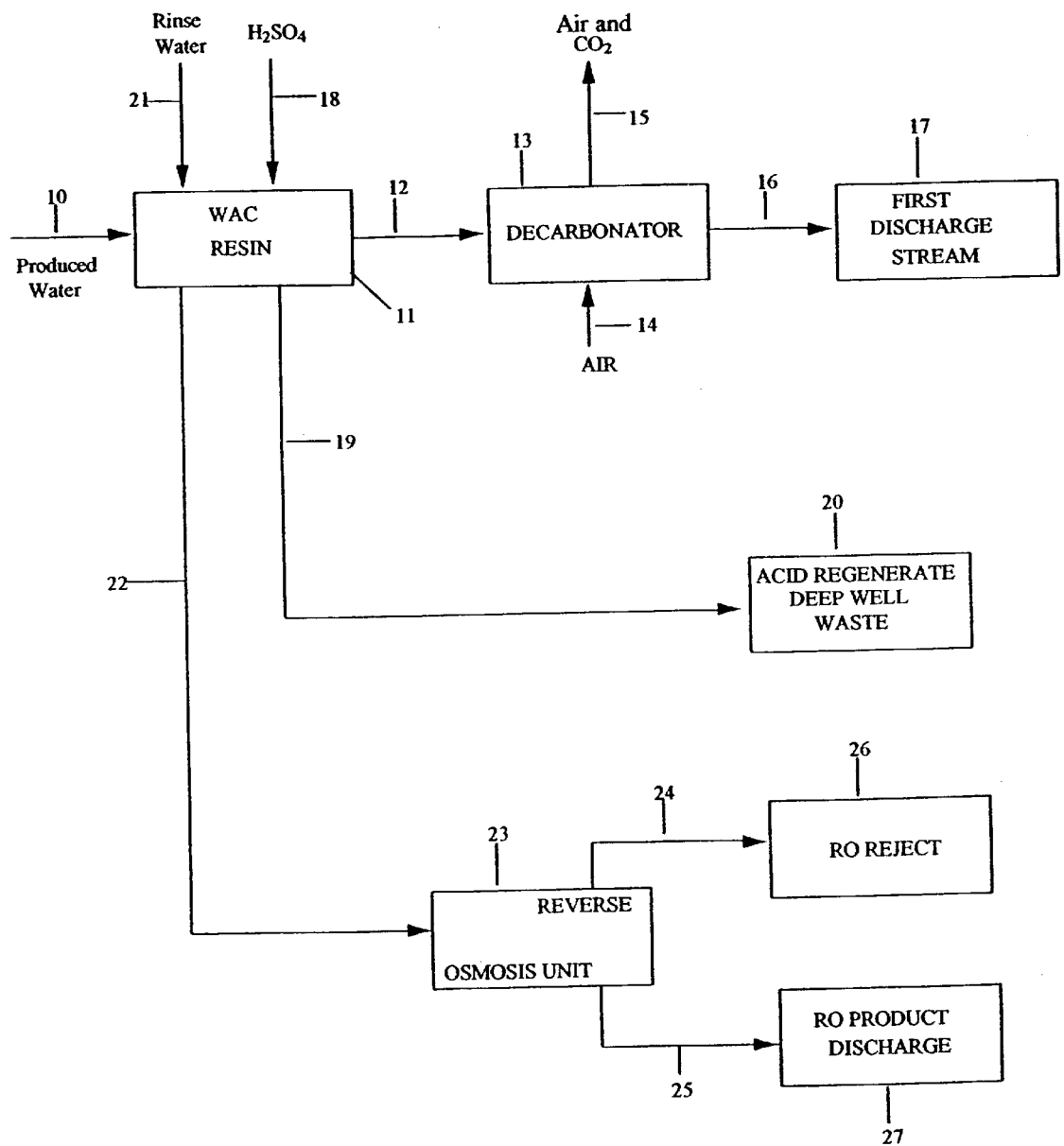
FIG. 1 is a flow diagram of a method of the invention.

In describing the preferred embodiment of the present invention, reference will be made herein to FIG. 1 of the drawings. Features of the invention are not necessarily shown to scale in the drawings.

Produced water contains high concentrations of various water-soluble salts (typically greater than 1000 ppm) usually typified by those present in sea water. Produced water may also commonly contain hydrocarbons and other dissolved water-soluble organic electrolytes.

In produced water formed from natural gas deposits associated with 25 bituminous coal deposits, the majority of the dissolved solids is in the form of sodium bicarbonate. Smaller amounts of calcium, magnesium, potassium and barium carbonates are also typically present. It is these compounds which are to be removed using the method and apparatus of the invention to reduce the TDS of the produced water so that the treated water can be safely discharged to the environment.

A cation resin, preferably a weak acid cation resin, and most preferably in the acid ($H^+$) form, will remove cations from the produced water and replace them with hydrogen ions. Hydrogen ions in the resulting reduced dissolved solids produced water stream will then react with bicarbonate ions and other such ions in the stream and convert the bicarbonates to carbon dioxide. The carbon dioxide is then preferably removed by air stripping through a forced draft decarbonator (mixer). This procedure is optional but preferred. This part of the process is typically capable of reducing the total dissolved solids of the produced water of about 1000 to 1600 ppm TDS or more to about 100 ppm or 50 ppm TDS or less. Treated water containing this level of TDS may be safely discharged to surface water streams.

The produced water treated resin is now loaded with the removed cations from the produced water (solids loaded resin) and is regenerated to the hydrogen ion form for treating additional produced water. The resin is preferably regenerated with a dilute acid and, in particular, it is preferred to use dilute sulfuric acid in an amount of about 0.25 to 10%, preferably 3 to 6%, e.g., 5% sulfuric acid because of its demonstrated effectiveness. The sulfuric acid is preferably diluted with produced water but may be diluted with clean water.

The amount of acid required to regenerate the resin is relatively small because the loaded resin regenerates with stoichiometric amounts of acid. The resultant acid regenerated waste stream is discharged to a deep well as a reject stream.

A significant amount of residual salt is still present on the acid regenerated resin however, and a large amount of water is typically required to rinse ions such as sulfate ions (if $H_2SO_4$ is used as the rinse water) from the resin in order to avoid contaminating new produced water with excessive amounts of sulfate after the regeneration process has been completed. The rinse water required to remove the sulfate from the regenerated ion exchange resin could be as much as 30% of the total volume of produced water treated.

To reduce this volume, it is an important feature of the invention that a two-step procedure be employed using first the dilute acid stream and then a produced water stream. The rinse water is segregated from the acid regenerated waste stream and the rinse water further concentrated with a reverse osmosis unit or other such salt separation unit. Accordingly, the rinse water, which is preferably produced water, is passed through the acid regenerated cation resin to form a residual salt containing rinse stream which stream is then passed through a salt separation unit, e.g., a reverse osmosis unit. The reject stream from the reverse osmosis unit containing a large amount of salt is passed to a deep well as a reverse osmosis reject stream and the reverse osmosis product water discharge stream containing a low amount of salt may be passed safely to the environment.

Cation resins such as weak acid cation resins are well known in the art and basically remove cations from a feed water and replaces these cations typically with hydrogen ions. Any of a wide variety of cation resins, preferably weak acid cation resins, can be used and it is preferred to use Purolite C105E because of its demonstrated effectiveness. Other resins include Rohm & Haas IRC 86, Rohm & Haas IRC 76 or Dow MAC-3.

Reverse osmosis membrane systems are used widely for purifying water such as desalinating seawater for potable water and irrigation purposes. For reverse osmosis membranes, a charge liquid containing a more permeable and a less permeable component is maintained and contacted under pressure with a non-porous separating layer. In a reversal of the cellular osmotic process, a portion of the charge liquid, predominately liquid, dissolves into the membrane and diffuses therethrough with a decreased concentration of salts. Usually, a substantial portion of the solute is left behind as the retenate and in the subject process as a reverse osmosis reject stream. Any suitable reverse osmosis membrane may be used in the method and apparatus of the invention and it is preferred to use a thin film composite because of its demonstrated effectiveness. Other suitable salt removal units may likewise be employed.

Referring now to FIG. 1, a flow diagram of a preferred method of the invention is shown. A produced water stream 10 to be treated to reduce the total dissolved solids CTDS) of the produced water is fed into a weak acid cation resin 11 to form a reduced dissolved solids produced water stream 12. This stream now has $H^+$ ions substituted for the removed cations of the produced water. The $H^+$ ions react with bicarbonate ions in the reduced dissolved solids produced water steam to form $CO_2$. Heat or other means may be used if necessary to accelerate $CO_2$ formation.

The reduced dissolved solids produced water stream 12 is passed into a decarbonator 13 and mixed with an air stream 14 to strip the $CO_2$ from the treated water. A small amount of the air dissolves in the water but the majority of the $CO_2$ is expelled from the water and combines with the air and exits the decarbonator with the majority of the air stream 15. The air does not form a part of the material balance of the process because it merely strips the $CO_2$. The $CO_2$ removed liquid stream is a first discharge stream 16 which now has a low TDS of approximately about 30 ppm or less. Stream 16 is discharged at 17 which is a surface water stream or the like. Typically, the produced water starting with a TDS of about 1300 to 1600 ppm will be reduced to about 50 ppm TDS using the weak acid cation resin and decarbonator. The decarbonator is optional to remove gases but is preferred. Also, the first discharge stream 16 may be treated with lime or other material to adjust the sodium/calcium ratio and/or pH of the discharge water before discharge to 17.

The weak acid cation resin 11 is now loaded with cations (solids loaded resin) and it is necessary to regenerate the resin using an acid 18 to convert the resin back to its $H^+$ form for further treatment with produced water. The preferred acid is sulfuric acid but any suitable acid may be used. The sulfuric acid is preferably used in a dilute solution of about 2 to 6 %, typically 5% and is diluted with produced water although clean water could also be used. An acid regenerated waste stream 19 is formed by passing the acid 18 through the solids loaded weak acid cation resin and the acid regenerated waste stream 19 may be passed to a deep well 20 for safe waste discharge.

It is now necessary to rinse the acid regenerated weak acid cation resin to remove residual salts such as sulfate when using sulfuric acid as the regenerant. A rinse water 21, preferably produced water, is passed through the acid regenerated resin 11 to form a residual salt containing rinse stream 22. Stream 22 contains a large amount of sulfate ion due to the use of sulfuric acid as the acid resin regenerator. The residual salt containing rinse stream 22 is then passed through a reverse osmosis unit 23 to form a reverse osmosis reject stream 24 and a reverse osmosis product water discharge stream 25. The reverse osmosis reject stream 24 containing a high concentration of salt is then discharged to a deep well or other safe discharge 26. The reverse osmosis product water discharge stream 25 (low salt) may be safely discharged to a surface water stream 27.

While the above process has been described as a continuous process, it will be appreciated to those skilled in the art that the process is typically a series of batch operations which are performed independently.

Various embodiments of the present invention will now be illustrated by reference to the following specific example. It is to be understood, however, that such example is presented for purposes of illustration only, and the present invention is in no way to be deemed as limited thereby. All parts and percentages are by weight unless otherwise indicated.

Produced water was treated as shown in FIG. 1 and the results are as shown in Table 1.

TABLE 1

| Stream No. | Stream Name | TDS (ppm) | TDS #/day |
| --- | --- | --- | --- |
| 10 | Produced Water | 1600 | 6060 |
| 12 | Reduced dissolved solids produced water | 50 | 180 |
| 14 | Air | | 177,000 |
| 15 | $CO_2$ | | 3347 |
| 16 | First Discharge Stream | 50 | 180 |
| 18 | 5% $H_2SO_4$ | 50 | 4087 |

TABLE 1-continued

| Stream No. | Stream Name | TDS (ppm) | TDS #/day |
|---|---|---|---|
| 19 | Acid Regenerated Waste Stream | 26,212 | 5106 |
| 21 | Rinse Water | 1600 | 1617 |
| 22 | Residual Salt Containing Rinse Stream | 3100 | 3132 |
| 24 | Reverse Osmosis Reject Stream | 61,525 | 3108 |
| 25 | Reverse Osmosis Product Discharge Water | 25 | 24 |

From the above example it may be seen that produced water may be efficiently and cost effectively treated using the method of the invention. Thus, a produced water stream 10 having a TDS of about 6060 (#/day) is treated to form a first discharge stream 16 having a TDS of 180 (#/day) and a reverse osmosis procduct discharge water stream 25 having a TDS of 24 (#/day). Two waste discharge streams 19 and 24 are formed having a TDS of 5106 (#/day) and 3108 (#/day, respectively.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for treating produced water to lower the total dissolved solids (TDS) of the water for safe environmental discharge comprising the steps of:

passing the produced water through a cation exchange resin in a $H^+$ form to remove cations and form a first discharge stream and a solids loaded resin;

discharging the first discharge stream to the environment;

regenerating the solids loaded resin to a $H^+$ form with a dilute acid solution to remove solids from the solids loaded resin into the dilute acid stream forming an acid regenerated waste stream and an acid regenerated resin;

rejecting the acid regenerated waste stream to a deep well, rinsing the acid regenerated resin with water to remove residual salts from the acid regenerated resin forming a residual salt containing rinse stream;

passing the residual salt containing rinse stream into a salt separation unit forming a high salt containing reject stream and a low salt containing product discharge water stream;

rejecting the high salt containing reject stream to a deep well; and discharging the low salt containing product water discharge stream to the environment.

2. The method of claim 1 wherein the produced water passed through the cation exchange resin forms a reduced dissolved solids produced water stream which stream is passed through a mixer with air to remove $CO_2$ gases forming the first discharge stream.

3. The method of claim 1 wherein the cation resin is a weak acid cation resin.

4. The method of claim 1 wherein the dilute acid solution is a $H_2SO_4$ solution diluted with produced water.

5. The method of claim 1 wherein the salt separation unit is a reverse osmosis unit.

* * * * *